US012106583B2

(12) United States Patent
Potnis (10) Patent No.: US 12,106,583 B2
(45) Date of Patent: Oct. 1, 2024

(54) VEHICULAR LANE MARKER DETERMINATION SYSTEM WITH LANE MARKER ESTIMATION BASED IN PART ON A LIDAR SENSING SYSTEM (71) Applicant: Magna Electronics Inc., Auburn Hills, MI (US)

(72) Inventor: Anuj S. Potnis, Hösbach (DE)

(73) Assignee: Magna Electronics Inc., Auburn Hills, MI (US)

( * ) Notice: Subject to any disclaimer, the term of this patent is extended or adjusted under 35 U.S.C. 154(b) by 363 days.

(21) Appl. No.: 17/449,527

(22) Filed: Sep. 30, 2021

(65) Prior Publication Data
US 2022/0108117 A1 Apr. 7, 2022

Related U.S. Application Data (60) Provisional application No. 63/198,194, filed on Oct. 2, 2020.

(51) Int. Cl.
*G06V 20/56* (2022.01)
*B60W 30/09* (2012.01)
(Continued)

(52) U.S. Cl.
CPC ........... *G06V 20/588* (2022.01); *B60W 30/09* (2013.01); *B60W 30/12* (2013.01); *B60W 30/14* (2013.01); *G01S 17/89* (2013.01); *B60W 2552/53* (2020.02)

(58) Field of Classification Search
CPC ........ G01S 17/89; G01S 17/87; G01S 17/931; G01S 7/4802; B60W 30/14; B60W 30/12;
(Continued)

(56) References Cited

U.S. PATENT DOCUMENTS 5,550,677 A 8/1996 Schofield et al.
5,670,935 A 9/1997 Schofield et al.
(Continued)

FOREIGN PATENT DOCUMENTS

WO WO-2018212286 A1 * 11/2018 ............. G01C 21/28

OTHER PUBLICATIONS

Lee, Hyunsung, et al. "AVM/LiDAR sensor based lane marking detection method for automated driving on complex urban roads." 2017 IEEE Intelligent Vehicles Symposium (IV). IEEE, 2017. (Year: 2017).*
(Continued)

*Primary Examiner* — Vu Le
*Assistant Examiner* — Tracy Mangialaschi
(74) *Attorney, Agent, or Firm* — HONIGMAN LLP (57) ABSTRACT A vehicular driving assistance system includes a camera and a LIDAR sensor disposed at a vehicle. An electronic control unit (ECU) includes at least one data processor. The system, responsive to processing of image data captured by the camera, determines a lane marker ahead of the vehicle. The system, responsive to processing of sensor data captured by the LIDAR sensor, determines a first portion of the lane marker forward of the vehicle and determines a second portion of the lane marker rearward of the vehicle. The system interpolates the lane marker between the first portion and the second portion. The system, responsive to the determined lane marker and the interpolated lane marker, estimates location of a front wheel of the vehicle relative to the lane marker.

20 Claims, 3 Drawing Sheets (51) Int. Cl.
*B60W 30/12* (2020.01)
*B60W 30/14* (2006.01)
*G01S 17/89* (2020.01)

(58) Field of Classification Search
CPC .. B60W 30/09; B60W 60/00; B60W 2420/42; B60W 2420/52; B60W 2552/53; B60W 2420/403; B60W 2420/408; G06V 20/588
See application file for complete search history.

(56) References Cited

U.S. PATENT DOCUMENTS

| | | |
|---|---|---|
| 5,796,094 A | 8/1998 | Schofield et al. |
| 5,949,331 A | 9/1999 | Schofield et al. |
| 6,396,397 B1 | 5/2002 | Bos et al. |
| 6,690,268 B2 | 2/2004 | Schofield et al. |
| 6,693,517 B2 | 2/2004 | McCarthy et al. |
| 7,038,577 B2 | 5/2006 | Pawlicki et al. |
| 7,156,796 B2 | 1/2007 | Makley |
| 7,580,795 B2 | 8/2009 | McCarthy et al. |
| 7,720,580 B2 | 5/2010 | Higgins-Luthman |
| 7,855,755 B2 | 12/2010 | Weller et al. |
| 8,013,780 B2 | 9/2011 | Lynam |
| 8,229,663 B2 | 7/2012 | Zeng et al. |
| 8,666,591 B2 | 3/2014 | Stahlin et al. |
| 8,798,841 B1 | 8/2014 | Nickolaou et al. |
| 8,849,494 B1 | 9/2014 | Herbach et al. |
| 8,996,228 B1 | 3/2015 | Ferguson et al. |
| 9,008,890 B1 | 4/2015 | Herbach et al. |
| 9,079,587 B1 | 7/2015 | Rupp et al. |
| 9,098,753 B1 | 8/2015 | Zhu et al. |
| 9,147,219 B2 | 9/2015 | Binion et al. |
| 9,193,355 B2 | 11/2015 | Ferguson et al. |
| 9,221,461 B2 | 12/2015 | Ferguson et al. |
| 9,254,846 B2 | 2/2016 | Dolgov et al. |
| 9,255,989 B2 | 2/2016 | Joshi et al. |
| 9,262,787 B2 | 2/2016 | Binion et al. |
| 9,476,983 B2 | 10/2016 | Zeng |
| 9,511,767 B1 | 12/2016 | Okumura et al. |
| 9,534,910 B2 | 1/2017 | Okumura |
| 9,541,410 B1 | 1/2017 | Herbach et al. |
| 9,555,736 B2 | 1/2017 | Solar et al. |
| 9,734,417 B2 | 8/2017 | Ferguson et al. |
| 9,804,597 B1 | 10/2017 | Ferguson et al. |
| 9,831,630 B2 | 11/2017 | Lipson |
| 9,875,417 B2 | 1/2018 | Ferguson et al. |
| 9,892,567 B2 | 2/2018 | Binion et al. |
| 9,933,784 B1 | 4/2018 | Herbach et al. |
| 9,959,764 B1 | 5/2018 | Binion et al. |
| 10,493,899 B2 | 12/2019 | Solar et al. |
| 11,364,839 B2 | 6/2022 | Solar et al. |
| 11,572,013 B2 | 2/2023 | Solar et al. |
| 2004/0016870 A1 | 1/2004 | Pawlicki et al. |
| 2008/0273752 A1 | 11/2008 | Zhu et al. |
| 2009/0085775 A1 | 4/2009 | Otsuka et al. |
| 2009/0251355 A1 | 10/2009 | Nanami |
| 2010/0091513 A1 | 4/2010 | Kamioka |
| 2010/0182432 A1 | 7/2010 | Augst |
| 2011/0054716 A1 | 3/2011 | Stahlin et al. |
| 2012/0062743 A1 | 3/2012 | Lynam et al. |
| 2012/0218412 A1 | 8/2012 | Dellantoni et al. |
| 2012/0290146 A1 | 11/2012 | Dedes et al. |
| 2013/0090806 A1 | 4/2013 | Hahne |
| 2013/0135117 A1 | 5/2013 | Morimoto |
| 2013/0242284 A1 | 9/2013 | Zeng |
| 2013/0325241 A1 | 12/2013 | Lombrozo et al. |
| 2014/0032012 A1 | 1/2014 | Joshi et al. |
| 2014/0052367 A1 | 2/2014 | Hahne |
| 2014/0067187 A1 | 3/2014 | Ferguson et al. |
| 2014/0236414 A1 | 8/2014 | Droz et al. |
| 2014/0330479 A1 | 11/2014 | Dolgov et al. |
| 2015/0112504 A1 | 4/2015 | Binion et al. |
| 2015/0112543 A1 | 4/2015 | Binion et al. |
| 2015/0112730 A1 | 4/2015 | Binion et al. |
| 2015/0124096 A1 | 5/2015 | Koravadi |
| 2015/0153184 A1 | 6/2015 | Mudalige et al. |
| 2015/0158499 A1 | 6/2015 | Koravadi |
| 2015/0219764 A1 | 8/2015 | Lipson |
| 2015/0251599 A1 | 9/2015 | Koravadi |
| 2015/0266471 A1 | 9/2015 | Ferguson et al. |
| 2015/0329111 A1 | 11/2015 | Prokhorov |
| 2015/0352953 A1 | 12/2015 | Koravadi |
| 2016/0018524 A1 | 1/2016 | Zeng |
| 2016/0036917 A1 | 2/2016 | Koravadi et al. |
| 2016/0162743 A1 | 6/2016 | Chundrlik, Jr. et al. |
| 2016/0205656 A1 | 7/2016 | Zeng et al. |
| 2016/0210853 A1 | 7/2016 | Koravadi |
| 2016/0272207 A1 | 9/2016 | Dolgov et al. |
| 2017/0248962 A1 | 8/2017 | Hasberg et al. |

OTHER PUBLICATIONS

Raguraman SJ, Park J. Intelligent drivable area detection system using camera and lidar sensor for autonomous vehicle. In 2020 IEEE International Conference on Electro Information Technology (EIT) Jul. 3, 20201 (pp. 429-436). IEEE. (Year: 2020).*

Jeong Y, Yi K. Bidirectional long shot-term memory-based interactive motion prediction of cut-in vehicles in urban environments. IEEE Access. Jun. 17, 2020;8:106183-97. (Year: 2020).*

Han KY, Lee M, Lee YS. Implementation of autonomous driving of a ground vehicle for narrow high-curvature roads using surround view images. Multimedia Tools and Applications. Apr. 2020;79(13):8379-98. (Year: 2020).*

P. Papadimitratos, A. de La Fortelie, K. Evenssen, R. Brignolo and S. Cosenza, "Vehicular Communication Systems Enabling Technologies, Applications, and Future Outlook on Intelligent Transportation," IEEE Communications Magazine, Nov. 2009, pp. 84-95 (Year: 2009).

P. Popovski, "Ultra-Reliable Communication in 5G Wireless Systems," 1st International Conference on 5G for Ubiquitous Connectivity (5GU), 2014, pp. 146-151 (Year: 2014).

* cited by examiner

VEHICULAR LANE MARKER DETERMINATION SYSTEM WITH LANE MARKER ESTIMATION BASED IN PART ON A LIDAR SENSING SYSTEM

CROSS REFERENCE TO RELATED APPLICATION

The present application claims the filing benefits of U.S. provisional application Ser. No. 63/198,194, filed Oct. 2, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

Implementations herein provide a vehicular driving assistance system that includes a camera disposed at a vehicle equipped with the vehicular driving assistance system and viewing forward of the vehicle. The camera captures image data. The camera includes a CMOS imaging array with at least one million photosensors arranged in rows and columns. The system includes a LIDAR sensor disposed at the equipped vehicle that captures sensor data. The system includes an electronic control unit (ECU) with electronic circuitry and associated software. The electronic circuitry of the ECU includes at least one data processor for processing image data captured by the camera and sensor data captured by the LIDAR sensor. The vehicular driving assistance system, responsive to processing of image data captured by the camera, determines a lane marker forward of the equipped vehicle for a traffic lane along which the equipped vehicle is traveling. The vehicular driving assistance system, responsive to processing of sensor data captured by the LIDAR sensor, as the equipped vehicle travels along the traffic lane, determines a first portion of the lane marker forward of the equipped vehicle. The vehicular driving assistance system, responsive to processing of sensor data captured by the LIDAR sensor, as the equipped vehicle travels along the traffic lane, determines a second portion of the lane marker rearward of the equipped vehicle. The vehicular driving assistance system determines an interpolated lane marker by interpolating between the determined first portion of the lane marker forward of the equipped vehicle and the determined second portion of the lane marker rearward of the equipped vehicle. The vehicular driving assistance system, responsive to the determined lane marker and the interpolated lane marker, estimates a location of a front wheel of the vehicle relative to the lane marker.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
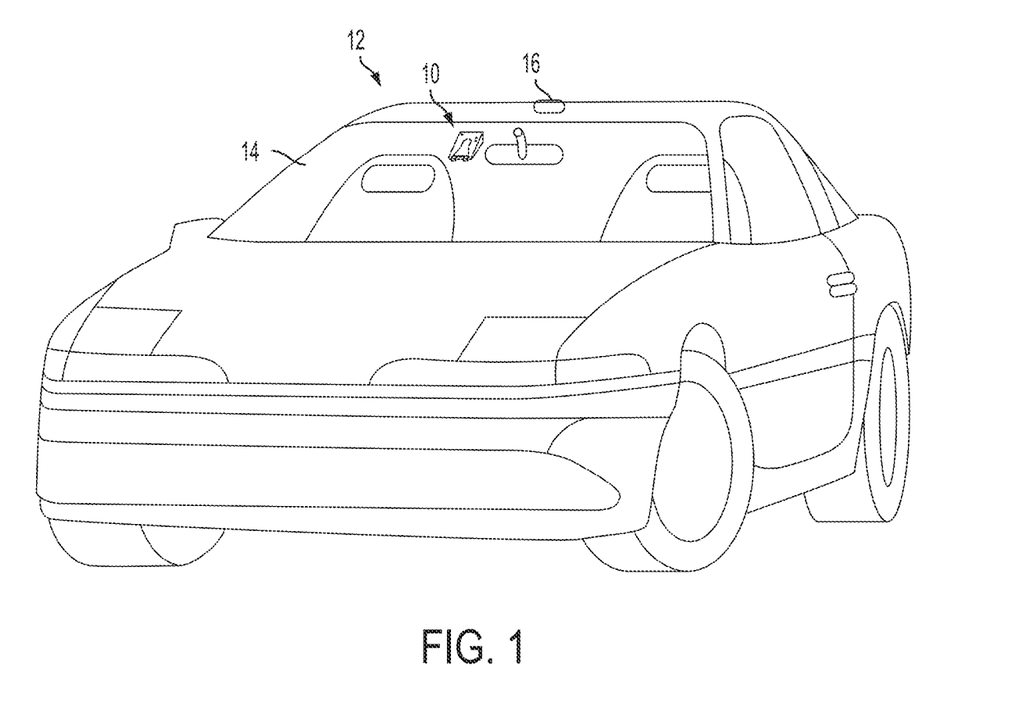
FIG. 1 is a perspective view of a vehicle with a vision system that incorporates a forward viewing camera.

Referring now to the drawings and the illustrative embodiments depicted therein, a vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) having electronic circuitry and associated software, with the electronic circuitry including a data processor or image processor that is operable to process image data captured by the camera or cameras, whereby the ECU may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle.

Figure 2:
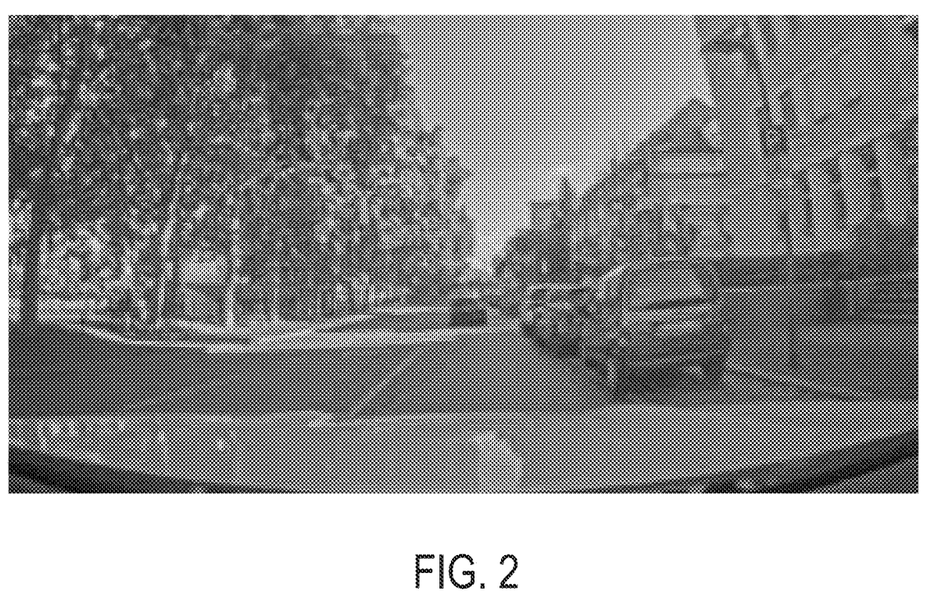
FIGS. 2 and 3 are views of a forward viewing camera of a vehicle, showing that the camera cannot view lane markers immediately in front of or along the side of the equipped vehicle.
Figure 3:
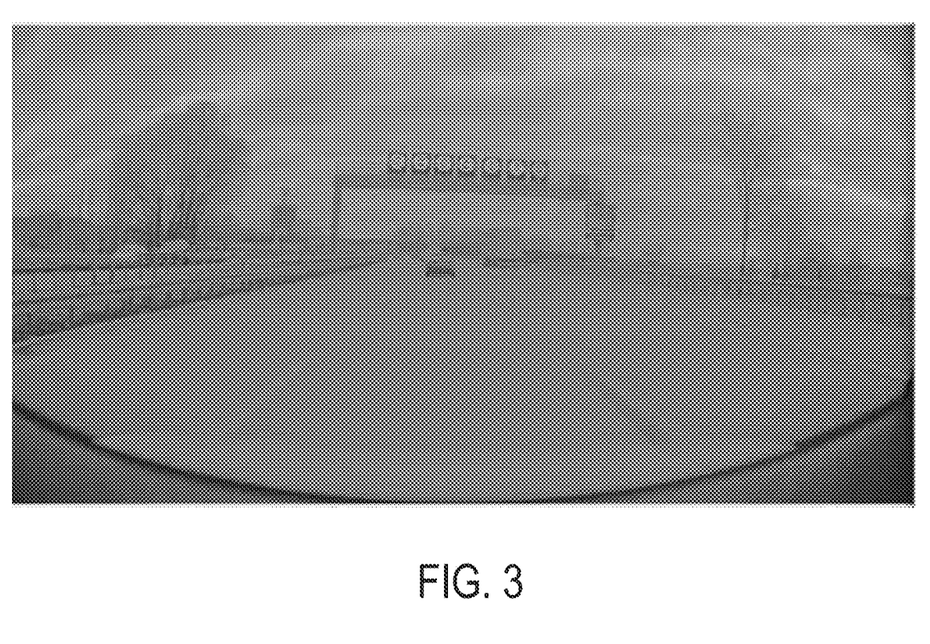

As shown in FIGS. 2 and 3, the forward viewing camera views forward of the vehicle (such as through the upper region of the windshield), such that the front part of the vehicle obstructs the camera's view of the road immediately in front of the vehicle. The forward viewing camera is thus unable to see whether or not the equipped vehicle has cut or crossed the lane marker at either side of the vehicle that marks the traffic lane along which the vehicle is traveling. This is because the hood and/or front bumper occludes the view of the lane markers. Thus, the system can only estimate or predict the lane marker position based on various image processing techniques and based on the detected lane markers well ahead of the vehicle, which may not be accurate.

Figure 4:
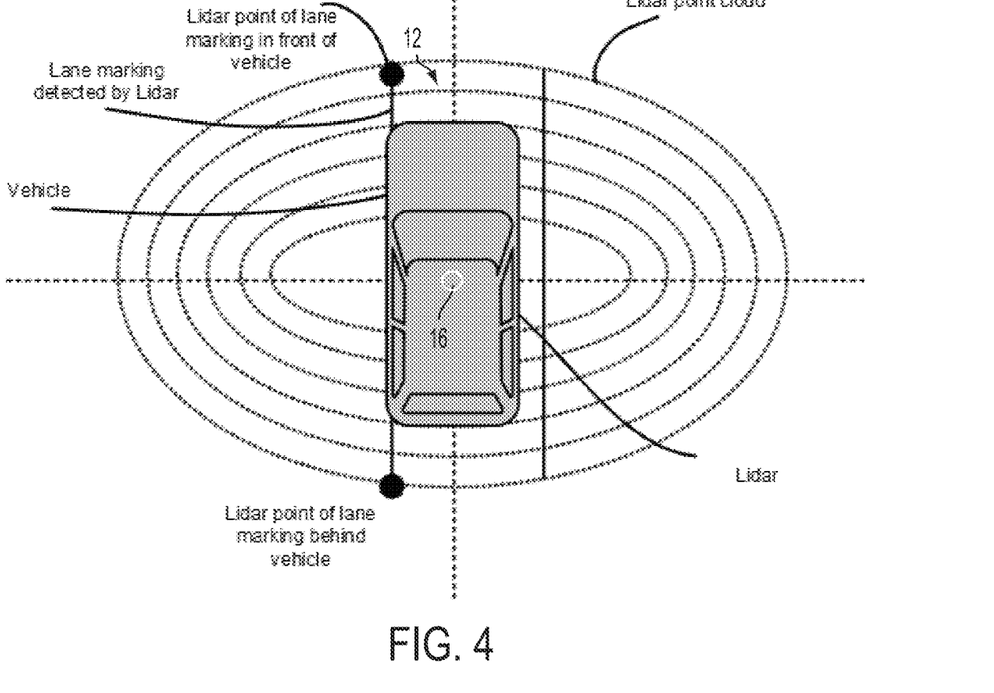
FIG. 4 is a schematic showing how a centered LIDAR system senses around the vehicle and determines lane markers immediately in front of and behind and along the side the equipped vehicle.
Figure 5:
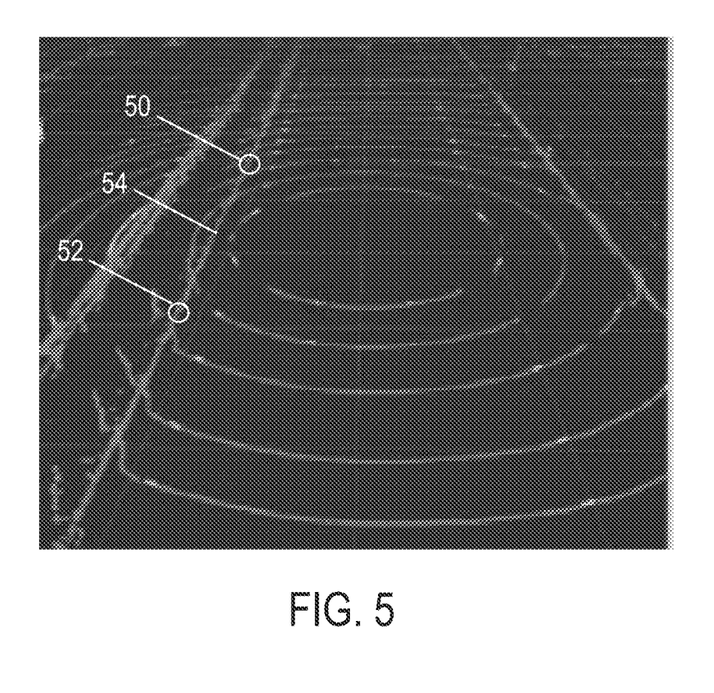
FIG. 5 is an image generated from an output of a LIDAR system of a vehicle, showing lane marker detection in front of and behind and along the side the equipped vehicle.

The vehicle 12 is equipped with a LIDAR sensing system 16, which may have one or more LIDAR sensors disposed at a central region of the vehicle (or one or more LIDAR sensors at each side of the vehicle or a plurality of LIDAR sensors disposed at other locations at the vehicle). The LIDAR sensors, when operated, emit pulses of laser light and receive reflected laser light back (e.g., a LIDAR point cloud), with the system determining the reflection times for the pulsed laser light to determine objects present in the field of sensing of the LIDAR sensor. The LIDAR sensing system detects lane markers on the road due to the greater reflectivity of lane markers (as compared to the road surface), such as can be seen with reference to FIGS. 4 and 5. As used herein, a lane marker refers to any indication of a boundary of one side (i.e., the left side or the right side) of a traffic line. The lane marker may be represented by a continuous and unbroken line (e.g., of paint or other material), a dashed line, or any other patterns or indications that indicates the boundary of the traffic lane. Some traffic lanes may have no lane markers, some traffic lanes may have only a single lane marker (i.e., only on the left side or only on the right side), and some traffic lanes may have two lane markers (i.e., a lane marker on the left side and a lane marker on the right side).

Thus, the system herein utilizes, for example, a 360 degree roof-top LIDAR sensor (or at least a LIDAR sensing system that senses both forward of the vehicle and rearward of the vehicle, such as a first LIDAR sensor disposed at a forward portion of the vehicle and a second LIDAR sensor disposed at a rearward portion of the vehicle) that senses the lane markings both in front of the vehicle and behind the vehicle. The system uses the detected lane markings in front of and behind the vehicle as seen from the LIDAR sensor(s), and interpolates these data points to fit a line 54 between the points in front of and behind the vehicle (e.g., points 50 and 52 of FIG. 5) to complete the lane marking along the side of the vehicle and in the blind spot of any camera(s) equipped at the vehicle. As shown in the data or output of FIG. 5, the front white circle 50 or marker has an X-Y vector such as [10 m, 1.8 m], the back white circle 52 or marker has an X-Y vector such as [−5.7 m, 1.7 m]. The X and Y coordinates may be referenced to a location relative of the vehicle (e.g., a center of the vehicle). With this information, the system determines the Y location (the lateral location relative to the vehicle) of the lane markers at any given X location (the longitudinal location of the lane marker relative to the vehicle and forward/behind of the vehicle but not within the view of the forward viewing camera). Knowing the dimensions of the equipped vehicle, the system calculates the distance to crossing with respect to the front wheel of the vehicle at the lane marker (i.e., determines whether the front wheel of the vehicle has touched or crossed the lane marker). If the lane markings are curved (e.g., at and along a curved section of road) the system can use a higher order curved line fitting equation. However, since most roads (such as highways or multi-lane roads) have limits on their curvature (at least where traffic is flowing and lane markers are present), the system may assume that the road is effectively linear in the range of 15 meters or so between detected points of the lane marker ahead of and behind the vehicle. That is, because most roads do not have a significant curve over short stretches for safety reasons, the system may assume the road is linear when interpolating the lane marker positions with minimal error.

Thus, the system only needs to detect a single point on the lane marker behind the vehicle and a single point on the same lane marker ahead of the vehicle, and can interpolate a straight line for the lane marker between the two points and along the side of the vehicle. Optionally, the system may detect multiple points in front of and/or behind the vehicle to increase accuracy of the interpolation. If the road is curved, the system can assume it is straight over the short span of length of the vehicle, or the system can detect/pick multiple points in front of the vehicle and behind the vehicle and determine curvature of road based on those points (e.g., via curve fitting) and then interpolate a curved line along the side of the vehicle. The system uses the estimated lane marker locations along the vehicle and between the LIDAR-determined points in front of and behind the vehicle and may correlate or fuse the interpolated lane markers with the lane marker data or information determined via processing of image data captured by the forward viewing camera to provide lane marker information for the lane marker ahead of the vehicle and along the side of the vehicle, to effectively reduce or eliminate loss of lane marker location data due to blind spots in the field of view of the forward viewing camera. Although shown as detecting the lane marker along the left side of the vehicle in FIG. 4, clearly the system can operate, when applicable, to detect lane markers at both sides of the traffic lane along which the vehicle is traveling.

The system thus determines where the lane markers are along the side of the vehicle and in the region of the front wheel of the vehicle and immediately ahead of the front wheel and/or the front of the vehicle (and generally out of the field of view of any front viewing cameras). The system thus provides enhanced determination of when the wheels of the vehicle approach or cross over the lane markers along the side of the traffic lane along which the vehicle is traveling. This is used to determine more precise location of the lane markers in the blind spots of the forward viewing camera, and may be used in connection with any driving assist system of the vehicle that pertains to lateral movement or position of the vehicle in a traffic lane. For example, the enhanced or interpolated lane marker data or information may be used by a processor for (i) an autonomous vehicle control system of the vehicle, (ii) a lane departure warning system of the vehicle, (iii) a lane keep assist system of the vehicle, (iv) a lane centering system of the vehicle, (v) an adaptive cruise control system of the vehicle, (vi) a collision avoidance system of the vehicle, (vii) an automatic emergency braking system of the vehicle, and/or the like.

Optionally, the system may utilize image data captured by the forward viewing camera to determine the point on the lane marker ahead of the vehicle and may utilize lidar data captured by a rearward sensing LIDAR sensor to determine the point on the lane marker behind of the vehicle, and may interpolate between the determined points on the lane marker(s) to determine or estimate the location of the vehicle's tire or tires relative to the lane marker(s). Optionally, the system may use a forward viewing camera and/or a rearward viewing camera together in place of at least a portion of the LIDAR sensing system (e.g., a camera that has a field of view at least forward of the vehicle and/or a camera that has a field of view at least rearward of the vehicle). For example, the system, via image processing by an image processor of image data captured by the forward viewing camera and/or image data captured by the rearward viewing camera and/or the LIDAR sensing system, determines the lane marker(s) ahead and behind the vehicle and interpolates the lane marker(s) to determine or estimate the location of the vehicle's tire or tires relative to the lane marker(s).

For autonomous vehicles suitable for deployment with the systems described herein, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple LIDAR sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or LIDAR sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The system may utilize sensors, such as LIDAR sensors or radar sensors or the like. The sensing system may utilize aspects of the systems described in U.S. Pat. Nos. 9,753,121; 9,689,967; 9,599,702; 9,575,160; 9,146,898; 9,036,026;

8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587, 186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assistance system, the vehicular driving assistance system comprising:
   a camera disposed at a vehicle equipped with the vehicular driving assistance system and viewing forward of the vehicle, the camera capturing image data;
   wherein the camera comprises a CMOS imaging array, and wherein the CMOS imaging array comprises at least one million photosensors arranged in rows and columns;
   a LIDAR sensor disposed at the equipped vehicle, the LIDAR sensor capturing sensor data;
   an electronic control unit (ECU) comprising electronic circuitry and associated software;
   wherein the electronic circuitry of the ECU comprises at least one data processor for processing image data captured by the camera and sensor data captured by the LIDAR sensor;
   wherein the vehicular driving assistance system, responsive to processing of image data captured by the camera, determines a lane marker forward of the equipped vehicle for a traffic lane along which the equipped vehicle is traveling;
   wherein the vehicular driving assistance system, responsive to processing of sensor data captured by the LIDAR sensor, as the equipped vehicle travels along the traffic lane, determines a first portion of the lane marker forward of the equipped vehicle;
   wherein the vehicular driving assistance system, responsive to processing of sensor data captured by the LIDAR sensor, as the equipped vehicle travels along the traffic lane, determines a second portion of the lane marker rearward of the equipped vehicle;
   wherein the vehicular driving assistance system determines an interpolated lane marker by interpolating between at least one point on the determined first portion of the lane marker forward of the equipped vehicle and at least one point on the determined second portion of the lane marker rearward of the equipped vehicle; and
   wherein the vehicular driving assistance system, responsive to the determined lane marker and the interpolated lane marker, estimates a location of a front wheel of the vehicle relative to the lane marker.

2. The vehicular driving assistance system of claim 1, wherein the vehicular driving assistance system interpolates the lane marker between the determined first portion of the lane marker forward of the equipped vehicle and the determined second portion of the lane marker rearward of the equipped vehicle by interpolating a straight line between the determined portions.

3. The vehicular driving assistance system of claim 1, wherein the vehicular driving assistance system interpolates the lane marker between the determined first portion of the determined lane marker forward of the equipped vehicle and the determined second portion of the determined lane marker rearward of the equipped vehicle by line fitting to follow a determined curvature between the determined portions.

4. The vehicular driving assistance system of claim 1, wherein the vehicular driving assistance system determines the first portion of the determined lane marker forward of the equipped vehicle and the second portion of the determined lane marker rearward of the equipped vehicle based on a reflectivity of the determined lane marker.

5. The vehicular driving assistance system of claim 1, wherein the vehicular driving assistance system determines the location of a front wheel of the vehicle relative to the interpolated lane marker based in part on dimensions of the equipped vehicle.

6. The vehicular driving assistance system of claim 1, wherein the LIDAR sensor is disposed at a central region of a roof of the equipped vehicle.

7. The vehicular driving assistance system of claim 1, wherein the vehicular driving assistance system uses the interpolated lane marker for an autonomous vehicle control system of the vehicle.

8. The vehicular driving assistance system of claim 1, wherein the vehicular driving assistance system uses the interpolated lane marker for at least one selected from the group consisting of (i) a lane departure warning system of the vehicle, (ii) a lane keep assist system of the vehicle and (iii) a lane centering system of the vehicle.

9. The vehicular driving assistance system of claim 1, wherein the vehicular driving assistance system uses the interpolated lane marker for an adaptive cruise control system of the vehicle.

10. The vehicular driving assistance system of claim 1, wherein the vehicular driving assistance system uses the interpolated lane marker for at least one selected from the group consisting of (i) a collision avoidance system of the vehicle and (ii) an automatic emergency braking system of the vehicle.

11. The vehicular driving assistance system of claim 1, wherein at least a portion of the interpolated lane marker is outside the view of the camera.

12. A vehicular driving assistance system, the vehicular driving assistance system comprising:
a camera disposed at a vehicle equipped with the vehicular driving assistance system and viewing forward of the vehicle, the camera capturing image data;
wherein the camera comprises a CMOS imaging array, and wherein the CMOS imaging array comprises at least one million photosensors arranged in rows and columns;
a LIDAR sensor disposed at a roof of the equipped vehicle, the LIDAR sensor capturing sensor data representative of the environment forward and rearward of the vehicle;
an electronic control unit (ECU) comprising electronic circuitry and associated software;
wherein the electronic circuitry of the ECU comprises at least one data processor for processing image data captured by the camera and sensor data captured by the LIDAR sensor;
wherein the vehicular driving assistance system, responsive to processing of image data captured by the camera, determines a lane marker marking a boundary of a traffic lane along which the equipped vehicle is traveling;
wherein the vehicular driving assistance system, responsive to processing of sensor data captured by the LIDAR sensor, as the equipped vehicle travels along the traffic lane, determines a first portion of the lane marker forward of the equipped vehicle;
wherein the vehicular driving assistance system, responsive to processing of sensor data captured by the LIDAR sensor, as the equipped vehicle travels along the traffic lane, determines a second portion of the lane marker rearward of the equipped vehicle;
wherein the vehicular driving assistance system determines an interpolated lane marker by interpolating between at least one point on the determined first portion of the lane marker forward of the equipped vehicle and at least one point the determined second portion of the lane marker rearward of the equipped vehicle; and
wherein the vehicular driving assistance system, responsive to the determined lane marker and the interpolated lane marker, estimates a location of a front wheel of the vehicle relative to the lane marker.

13. The vehicular driving assistance system of claim 12, wherein the vehicular driving assistance system interpolates the lane marker between the determined first portion of the lane marker forward of the equipped vehicle and the determined second portion of the lane marker rearward of the equipped vehicle by interpolating a straight line between the determined portions.

14. The vehicular driving assistance system of claim 12, wherein the vehicular driving assistance system interpolates the lane marker between the determined first portion of the determined lane marker forward of the equipped vehicle and the determined second portion of the determined lane marker rearward of the equipped vehicle by line fitting to follow a determined curvature between the determined portions.

15. The vehicular driving assistance system of claim 12, wherein the vehicular driving assistance system determines the location of a front wheel of the vehicle relative to the interpolated lane marker based in part on dimensions of the equipped vehicle.

16. The vehicular driving assistance system of claim 12, wherein the vehicular driving assistance system uses the interpolated lane marker for at least one selected from the group consisting of (i) a collision avoidance system of the vehicle and (ii) an automatic emergency braking system of the vehicle.

17. A vehicular driving assistance system, the vehicular driving assistance system comprising:
a camera disposed at a vehicle equipped with the vehicular driving assistance system and viewing forward of the vehicle, the camera capturing image data;
wherein the camera comprises a CMOS imaging array, and wherein the CMOS imaging array comprises at least one million photosensors arranged in rows and columns;
a LIDAR sensor disposed at the equipped vehicle, the LIDAR sensor capturing sensor data representative of the environment rearward of the vehicle;
an electronic control unit (ECU) comprising electronic circuitry and associated software;
wherein the electronic circuitry of the ECU comprises at least one data processor for processing image data captured by the camera and sensor data captured by the LIDAR sensor;
wherein the vehicular driving assistance system, responsive to processing of image data captured by the camera, determines a first portion of a lane marker forward of the equipped vehicle for a traffic lane along which the equipped vehicle is traveling;
wherein the vehicular driving assistance system, responsive to processing of sensor data captured by the LIDAR sensor, as the equipped vehicle travels along the traffic lane, determines a second portion of the lane marker rearward of the equipped vehicle;
wherein the vehicular driving assistance system determines an interpolated lane marker by interpolating between at least one point on the determined first portion of the lane marker forward of the equipped vehicle and at least one point on the determined second portion of the lane marker rearward of the equipped vehicle; and
wherein the vehicular driving assistance system, responsive to the determined lane marker and the interpolated lane marker, estimates a location of a front wheel of the vehicle relative to the lane marker.

18. The vehicular driving assistance system of claim 17, wherein the vehicular driving assistance system interpolates the lane marker between the determined first portion of the lane marker forward of the equipped vehicle and the determined second portion of the lane marker rearward of the equipped vehicle by interpolating a straight line between the determined portions.

19. The vehicular driving assistance system of claim 17, wherein the vehicular driving assistance system interpolates the lane marker between the determined first portion of the determined lane marker forward of the equipped vehicle and the determined second portion of the determined lane marker rearward of the equipped vehicle by line fitting to follow a determined curvature between the determined portions.

20. The vehicular driving assistance system of claim 17, wherein the vehicular driving assistance system determines the first portion of the determined lane marker forward of the equipped vehicle and the second portion of the determined lane marker rearward of the equipped vehicle based on a reflectivity of the determined lane marker.

* * * * *